Jan. 10, 1950
A. F. BERGER
2,493,744
INTERIOR RADIALLY EXPANDING CLUTCH
WITH EQUALIZING MEANS
Filed Feb. 14, 1944
2 Sheets-Sheet 1
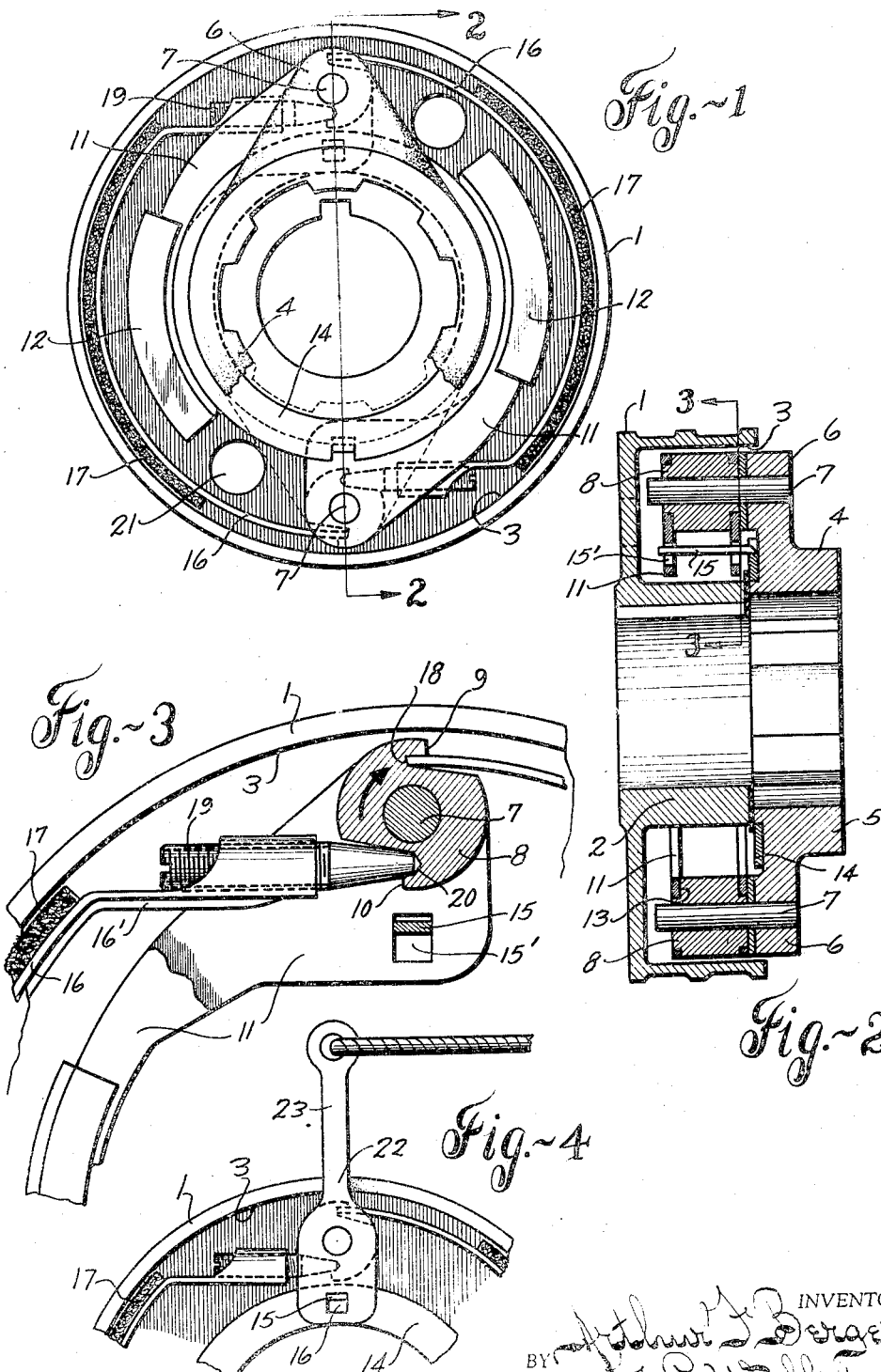

Jan. 10, 1950

A. F. BERGER 2,493,744

INTERIOR RADIALLY EXPANDING CLUTCH
WITH EQUALIZING MEANS

Filed Feb. 14, 1944

INVENTOR.
Arthur F. Berger
BY J. L. Walker
ATTORNEY

Patented Jan. 10, 1950

2,493,744

UNITED STATES PATENT OFFICE 2,493,744

INTERIOR RADIALLY EXPANDING CLUTCH WITH EQUALIZING MEANS

Arthur F. Berger, Dayton, Ohio, assignor to The Master Electric Company, Dayton, Ohio, a corporation of Ohio Application February 14, 1944, Serial No. 522,250

14 Claims. (Cl. 192—76)

This invention pertains to mechanically operated clutches, brakes and power control devices, and more particularly to frictional engaging units of rotary expansion and contraction type.

For illustrative purpose, but without intent to unduly limit its scope or application, the invention is herein illustrated and described as embodied in a centrifugally operated clutch of internal expansion construction, but is not limited thereto.

As heretofore constructed, the frictional shoes of such devices are usually pivotally mounted for oscillatory motion into and out of engaging relation. The frictional contact engagement of such oscillatory engaging members is ununiform and the engaging pressure is not evenly distributed over the engaged frictional area.

The frictional power unit forming the subject matter hereof is so constructed that the frictional shoes or engaging elements have substantially right line motion into and out of operative relation with the frictional surface of the engaged member. Due to the relatively large area of frictional engaging surface engaged under evenly distributed pressure, the load capacity and effective torque is materially increased.

The object of the invention is to improve the construction as well as the mode of operation of expansive and contractive frictional power transmission units, whereby they may not only be economically manufactured and operated, but will be more efficient in use, automatic in action, uniform in operation, having few operating parts, and be unlikely to get out of repair.

A further object of the invention is to provide an efficient frictional power unit of compact form and small size with maximum load capacity, wherein the wear of the engaging faces will be uniformly distributed and the life thereof prolonged.

A further object of the invention is to provide a frictional power unit of sufficiently small size and large load capacity to enable it to be conveniently mounted interiorly of a typical electric motor.

A further object of the invention is to provide a frictional unit capable of equally effective operation in either direction of relative rotation.

A further object of the invention is to provide a frictional unit sensitive to fluctuations of speed of rotation and readily responsive to variations of centrifugal influence which will be effective within a prescribed range of speed and load.

A further but nonetheless important object of the invention is to provide an operating mechanism by which the movement of the frictional engaging members into and out of engagement is effected by a substantially straight line equalized movement and their pressures equalized.

A further object of the invention is to provide a frictional power unit of the character herein described, having the advantageous structural features and inherent meritorius characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only form of embodiment of the invention, Fig. 1 is a side view of an assembled centrifugal clutch unit partly broken away, embodying the present invention.

Fig. 2 is a diametrical sectional view on the line 2—2 of Fig. 1.

Fig. 3 is an enlarged detail sectional view on line 3—3 of Fig. 2.

Fig. 4 is a detail view showing the present invention applied to a brake unit.

Like parts are indicated by similar characters of reference throughout the several views.

Figures 5, 6, 7, 8:
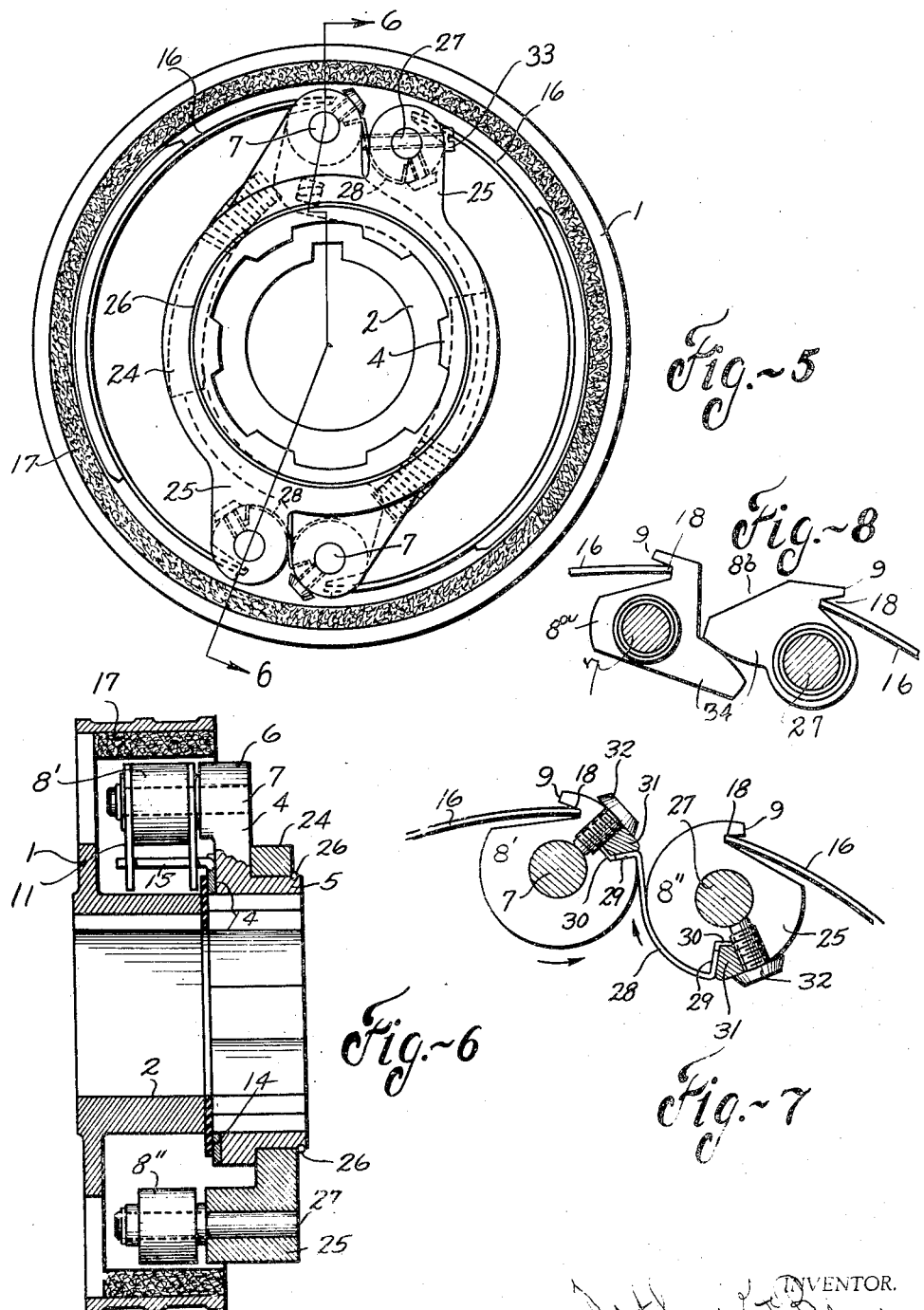
Figs. 5 and 6 are respectively a side elevation and diametrical sectional view of a duplex form of embodiment of the invention.
Fig. 7 is a detail view.
Fig. 8 is a detail view of a modification of the duplex operating means.

Referring to Figs. 1, 2 and 3 of the drawings, wherein is illustrated a frictional clutch unit embodying the instant invention, 1 identifies a laterally recessed drum comprising the driven member having a central hub 2 by which it may be fixedly secured upon a driven shaft. The internal circumferential surface 3 comprises the frictional surface to be intermittently engaged by relatively adjustable friction shoes.

Mounted closely adjacent to the laterally open side of the drum 1 is a driving member 4, comprising a hub 5 engageable with a driving shaft, or, for example, the rotor of an electric motor, and diametrically opposite peripheral ears 6 supporting pivotal studs 7—7 upon which the operating parts of the assembly are mounted interiorly of the drum 1. Mounted on the studs 7 are hubs 8 having reversely facing diametrically opposite shoulders 9 and 10. Fixedly attached to the opposite ends of the hubs 8 are bifurcated oscillatory weight arms 11 carrying at their free ends centrifugally influenced weights 12.

The spaced furcations of the arms 11 are seated in terminal rabbets 13 of the hubs and securely united thereto for unison oscillation. The oscillatory weight arms 11 are interconnected for equalized movements by a ring 14 interposed between the hub 2 of the driven drum 1 and the hub 5 of the driving member for independent rotative adjustment. The ring 14 is provided at diametrically opposite points with fingers 15 which project through aligned holes 15' in the spaced furcations of the weighted arms 11. The construction is such that the swinging motion of one of the weighted arms 11 and its hub 8 in either direction is transmitted to the opposite arm 11 and hub 8 by a corresponding rotative adjustment of the ring 14 to insure equalized rocking movements of the respective hubs 8. The fingers 15 are preferably, but not necessarily, formed integrally with the ring by being stamped from a single piece of material and bent to perpendicular relation to the plane of the ring.

Disposed within the drum 1 in substantially parallel relation with opposite sectors thereof are arcuate friction shoes 16, to the outer or convex faces of which are secured strata 17 of friction material. The shoes 16 are preferably longitudinally ribbed or flanged at 16', Fig. 3, to stiffen the arcuate shoes and increase their resistance to bending strain. The friction material 17 may be of any suitable character, such as metallic or woven material, or of other character according to the conditions of use and work to be performed. The contact faces of the friction surfaces of the shoes are contoured to agree with the interior face 3 of the drum 4. One end of each arcuate friction shoe 16 abuts against the shoulder 9 of the rocking hub 8, which is preferably undercut or recessed at 18 to provide a seat therefor. The other end of each arcuate friction shoe 16 is provided with an adjustable screw threaded stud 19 which seats in a depression or seat 20 in the face 10 of one of the hubs 8. The adjustment of the screw threaded stud 19 enables looseness or play to be eliminated and the assembly rendered accurately responsive to minute movement of the weighted arms.

The oppositely disposed reverse shoulders 9 and 10 of the hubs 8 against which the ends of the opposite friction shoes are engaged in approximately equally spaced relation with the axis of oscillation of the hub and connected arm affords leverage by which upon outwardly swinging movement of the corresponding arm the end of one friction shoe 16 is forced laterally in one direction and that of the other shoe is forced in the opposite direction. The opposite ends of the respective shoes 16 being engaged in like manner with the other of the hubs 8 receive like outward leverage influence, by similar rotation of the other hub. The rotative adjustment of the respective hubs 8 and corresponding reverse movements of the ends of the arcuate friction shoes are equalized by the ring 14 which interconnects the weighted levers 11.

The separating influence exerted upon the arcuate friction shoes being equal at their opposite ends, the shoes are moved apart and into contact engagement with the interior face 3 of the drum 1 in substantially straight lines. As a result the frictional engagement of the surfaces 17 with the interior of the drum occurs simultaneously and under uniform pressure throughout the length of the friction faces 17.

By varying the weights 12 of the arms 11 the friction elements may be made to engage and disengage at predetermined speeds. Also, by adjustment of the weights the frictionally engaged surfaces may be caused to slip at a prescribed maximum load or resistance, thereby preventing the overloading of a driving motor or other actuating mechanism. In the event the operating levers 11 should be unevenly weighted, whereby one will tend to swing outwardly quicker and more forcibly than the other, their operative movements will be coordinated and their action equalized by the corresponding rotative adjustment of the ring 14, by which excessive inertia of one weighted lever will be imparted to the other lever to insure uniform equal pressures upon the respective friction shoes.

The resulting straight line adjustment of the friction shoes into operative engagement with the drum 1 is quite advantageous in affording evenly distributed pressure throughout the entire friction area, which affords increased load capacity and driving or braking torque, as the case may be. Such application of uniform evenly distributed pressure minimizes localized wear and increases the wearing ability and effective life of the frictional surfaces. The small size and compact construction of the present unit enables it to be incorporated within an electric motor housing for purpose of connecting and disconnecting the motor rotor with the rotor shaft in accordance with fluctuations of its speed of rotation, whereas former clutches of equivalent load capacity have necessarily been of such size as to preclude such installation.

Although the weights 12 are relatively small and the range of movement of the swinging arms quite limited, the construction is such that the centrifugal influence and movement is amplified to such extent that the unit will perform the function of a conventional unit of much greater size. Furthermore, the present unit is readily accessible for repairs and inspection by merely sliding the drum axially of a driven shaft away from the driver and the entire mechanism is exposed. To permit dust, grit and foreign material to readily escape, and to afford ample ventilation, the web of the drum 1 is preferably provided with a plurality of air holes 21.

While the construction has been described as embodied in a friction clutch, for which it is well adapted, substantially the same construction, from which the weighted arms 11—12 are omitted, may be utilized as a brake unit, illustrated in Fig. 4. In this construction the hubs 8 carry spaced arms 22, having therein holes 16 in which the fingers 15 of the equalizing ring 14 engages to transmit rocking motion uniformly from one hub to the other. Adjustment of an oscillatory brake lever 23 connected with one of the hubs 8, the movement of which is transmitted from one hub to the other by the ring 14, serves to adjust the friction shoes into frictional engagement with the interior face 3 of the drum proportionately to the power applied to the lever 23.

In Figs. 5 and 6 is shown a duplex arrangement of the clutch construction heretofore described, wherein substantially the same elements are employed, but the friction shoes are separately operated and relative adjustment enabled. In such embodiment the assembly of the driven drum 1 affixed to a shaft by its hub 2 and associated with the driving member 4, provided with the hub 5 engageable with a drive shaft or the like, and radially disposed ears or lugs 6 carrying the pivotal studs 7, is substantially as shown in the preceding figures of the drawing and heretofore described. Journaled on the hub 5 of the driving member or spider 4 for limited oscillatory adjustment is a collar 24 having diametrically disposed ears or lugs 25 agreeing with the ears or lugs 6 of the driver 4. The collar is secured against displacement by a lock ring 26 seated in a peripheral groove in the hub 5. The ears or lugs 25 of the auxiliary collar 24 carrying studs or pins 27, which correspond to the pivotal studs 7 carried by the member 4.

Journaled on studs 7 and 27 of the respective members 4 and 24 are hubs 8' and 8", having at their outer sides shoulders 9 undercut as at 18 to receive the ends of the friction shoes 16, both extremities of which in this instance are flat. Each of the friction shoes 16 engages at one end with the shoulder 9 of a hub 8' carried by the main drive member 4 and at its opposite end with a like shoulder 9 of a hub 8" carried by an ear or lug 25 of the auxiliary collar 24. The hubs 8' and 8" are interconnected in pairs for unison rotative motion in opposite directions by a short flexible strip or link 28. The ends 29 of the coupling link 28 are angularly bent in opposite directions for engagement in notches 30 in the hubs 8' and 8" in relatively spaced relation with the friction shoe seats 9. The flexible coupling strip 28 extends between the hubs 8'—8" and follows in reverse curvilinear directions the peripheries of the respective hubs. The movement of a hub 8' by the action of the weighted arm 11 connected thereto is transmitted in reverse direction to the corresponding hub 8" by such coupling strip. The reversely bent ends of the strip are hooked in the notches, where they may be secured in any suitable manner. One method of locking the coupling strip ends, as shown in Fig. 7, consists in inserting a wedge 31 in the notch 30 alongside of the bent end 29 of the strip, and holding the wedge in clamping relation by the overhanging head of an adjusting screw 32. The oscillatory weighted arms 11 are connected with the hubs 8' and are interconnected and their movements are equalized by the ring 14 as before described. The oscillatory motion of the weighted arms 11 effects rocking motion of the hubs 8' to simultaneously adjust one end of each brake shoe connected with the respective hubs 8'. The rocking motion of the hubs 8' is transmitted to like degree by the coupling strips 28 to the hubs 8", with which the opposite ends of the friction shoes are engaged. Thus, one end of each friction shoe is adjusted by the rocking motion of one of the hubs 8', under direct influence of one weighted arm 11, while the opposite end of the same shoe is simultaneously adjusted to like extent by rocking motion of one of the hubs 8", to which motion is transmitted from the mating hub 8' under influence of the other weighted arm 11 by the coupling strip 28. By rotative adjustment of the collar 24 and its associated hubs 8" relative to the member 4 and the primary hubs 8', the range of movement of the friction shoes relative to the drum may be varied and wear or lost motion may be compensated. Such adjustment of the relatively rotative parts 4 and 24 is preferably effected by a screw 33. In Fig. 5 the friction material 17 is shown applied to the interior of the drum, where it is continuous and may be engaged by the shoes in any position of relative rotative adjustment. This materially increases the frictional contact surface and distributes the wear, thus materially increasing the period of effective operation of the unit. Such application of the friction material to the drum may be utilized in the primary construction illustrated in Figs. 1 to 4, as well as in the embodiment of Figs. 5 and 6.

In Fig. 8 there is shown a modification wherein thrust members 8a and 8b analogous to the thrust members 8' and 8" of Fig. 7 are journaled upon the studs 7 and 27 of the respective members 4 and 24, as before described. These thrust members also have shoulders 9 undercut as at 18 to receive the ends of the friction shoes 16, instead of being connected by the strap 28 for unison oscillation in opposite directions, as before described. These thrust members 8a and 8b are provided with interengaging radial arms 34, which cooperate somewhat in the manner of spur gear teeth whereby a partial rotation of one member will effect a like partial rotation of the other member to like degree. By such unison oscillatory motion outward thrust upon the friction shoes is exerted and relaxed in unison and to like degree. The oscillatory motion of one weighted arm is transmitted to one oscillatory thrust member 8a or 8b of each pair thereof and the motion of such member is transmitted to the other. It will be understood that there are provided two pairs of the thrust members 8a and 8b at diametrically opposite points as is shown in Fig. 5, each pair being under direct influence of one weighted arm or other actuating device. The respective weighted arms and the pairs of oscillatory thrust members are intercoupled for unison action by the equalizing ring 14, as before described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An expansive and contractive frictional unit, including driving and driven members, a pair of reversely disposed arcuate frictional shoes carried by one member and movable in unison into and out of frictional engagement with the other member, recessed oscillatory thrust elements carried by one of said members interposed between the adjacent ends of the arcuate friction shoes which are seated within the recesses and upon oscillation exerting simultaneous outward thrust pressure of the shoes into frictional engagement with the other of said members, fixed pivots carried by said member upon which the thrust elements are supported for oscillatory movement, and an equalizing ring interconnecting the oscillatory thrust members and rotatable in unison therewith for assuring uniform thrust motion of opposite ends of the friction shoes.

2. A frictional clutch wherein an annular revoluble driven member is periodically engaged by a pair of reversely disposed arcuate frictional shoes carried by a revoluble driving member characterized by equalized thrust movement of the opposite ends of the friction shoes, into frictional engagement with the annular driven member wherein the arcuate shoes move radially relative to the center of rotation of the annular driven member, including a pair of oppositely recessed oscillatory heads engaged by the corresponding ends of the respective shoes, the oppositely disposed recesses providing the sole support for the arcuate shoes and an equalizing ring having operative engagement with the respective oscillatory heads and rotatively adjustable in unison with oscillatory movement of the heads.

3. A frictional engaging unit wherein a pair of reversely disposed arcuate frictional shoes are intermittently engageable interiorly of a surrounding annular member by straight to and fro movements on a common directional line, including a pair of levers interposed between each end of the opposed arcuate shoes upon the opposite arms of which the arcuate shoes are supported, actuating means for at least one of the levers, and a motion transmitting and equalizing connection between the levers for actuating the levers in unison by which the oscillatory movements thereof are equalized to effect equal simultaneous adjustment of the opposite ends of the arcuate frictional shoes.

4. A frictional power control assembly wherein a revoluble annular member is intermittently interiorly engaged by a pair of reversely disposed frictional shoes movable to and from each other along a common diametric line of the annular member, including thrust devices for the frictional shoes with which the opposite ends of each of the shoes are engaged on a diametric plane common to the ends of the shoes under expanding pressure for effecting movement of said shoes from each other in relatively straight paths of travel into frictional engagement with the interior of the annular member, actuating means for at least one of the thrust devices and an interconnecting link equalizing the movement of the thrust devices with which the opposite ends of the frictional shoes engage.

5. An expansible and contractable frictional unit wherein a pair of reversely disposed arcuate friction shoes are intermittently engageable with the interior of a surrounding annular member, including a plurality of reversely shouldered oscillatory members interposed between the adjacent ends of the friction shoes upon the shoulders of which the friction shoes are supported, and actuating means for oscillating the shouldered members in unison to exert opposite thrust pressure simultaneously upon the opposite ends of the reversely disposed arcuate friction shoes to force the shoes through substantially straight line motion away from each other and into contact engagement with the surrounding annular member.

6. A frictional engaging unit wherein reversely disposed arcuate frictional shoes are intermittently engageable interiorly of a surrounding cooperating frictional member characterized by equalized thrust motion of opposite ends of the respective frictional shoes, including two pairs of oscillatory thrust members each having a seat thereon for engagement of the end of a friction shoe, the oscillatory thrust members engaged by the ends of one friction shoe being interconnected with the thrust members engaged by the ends of the other friction shoe for unison oscillation in opposite directions, actuating means for oscillating at least one oscillatory thrust member of one pair thereof, and an equalizer for assuring unison oscillation of the oscillatory thrust members of the opposite pair thereof.

7. A frictional power unit wherein a pair of reversely disposed arcuate frictional shoes are intermittently engageable simultaneously with the interior surface of a surrounding annular cooperating frictional member, characterized by recessed oscillatory thrust members adjacent opposite ends of the reversely disposed arcuate frictional shoes within the recesses of which the shoes are supported, the construction and arrangement being such that the oscillatory members exert equalized simultaneous separating pressure on the opposed ends of the respective shoes to move the respective shoes through substantially straight line paths into engagement with the surrounding annular frictional member.

8. A frictional power unit wherein a pair of reversely disposed arcuate frictional shoes are intermittently engageable simultaneously with the interior surface of a surrounding annular cooperating frictional member, including oscillatory supporting means for the frictional shoes, opposed sockets therein within which the ends of the frictional shoes are supported in a plane substantially parallel with a tangential plane of the oscillatory supports, actuating means for at least one of the supports exerting equalized pressure simultaneously upon the opposite ends of both frictional shoes and moving the intermediate segments of the arcuate shoes simultaneously into frictional engagement with the annular surrounding member under pressure.

9. A frictional power unit wherein a pair of reversely disposed arcuate frictional shoes are intermittently engageable simultaneously with the interior surfaces of a surrounding annular cooperating frictional member, oscillatory supports simultaneously engaging on a single diametric plane parallel to the axis of the frictional member the opposite ends of both of the arcuate shoes under expanding pressure and moving the respective shoes uniformly throughout their lengths through straight line paths into engagement with the surrounding annular member.

10. A frictional power unit, wherein a pair of reversely disposed arcuate frictional shoes are intermittently engageable simultaneously with the interior surfaces of a surrounding annular cooperating frictional member, including oscillatory supporting means for the frictional shoes with which the opposite ends of each of the arcuate shoes are engaged on a single diametric plane common to the ends of the shoes under expanding pressure and equalizing means confining the movements of opposite ends of the respective friction shoes to uniform degree, to cause uniform straight line movement of the respective shoes relative to the surrounding frictional member.

11. A frictional power unit wherein a pair of reversely disposed arcuate frictional shoes are intermittently engageable simultaneously with the interior surface of a surrounding annular frictional member, including oscillatory supporting members for the frictional shoes interposed between the opposite adjacent ends thereof, recessed bearing seats on said oscillatory members in radially spaced relation with their axes of oscillation engaged by the ends of the arcuate friction shoes and exerting thrust pressure in opposite directions thereon upon oscillation of said oscillatory members, means for actuating at least one of the members, and equalizing means maintaining uniform degree of oscillatory motion of the members intermediate the opposite ends of the arcuate frictional shoes.

12. A frictional power unit wherein a pair of reversely disposed arcuate frictional shoes are intermittently engageable simultaneously with the interior surface of a surrounding annular frictional member, including oscillatory supporting members interposed between the contiguous inturned opposite ends thereof, relatively movable seating areas thereon in which the ends of the opposite ends of the arcuate shoes are supported, and actuating means for uniformly oscillating the supports to effect unison uniform movement of the arcuate shoes throughout their lengths through straight line paths.

13. A frictional power unit wherein a pair of reversely disposed arcuate frictional shoes are intermittently engageable simultaneously with the interior surface of a surrounding annular frictional member, including movable supporting members interposed between the adjacent opposite ends thereof, shoe receiving seats therein within which the opposite ends of the frictional shoes are supported, actuating means for simultaneously moving the shoe receiving seats therein through substantially straight line movement of limited extent to separate the ends of one shoe from the ends of the other, and an equalizer maintaining the degree of separation of the opposite ends of the shoes uniform.

14. A frictional power unit wherein a pair of reversely disposed arcuate frictional shoes are intermittently engageable simultaneously with the interior surface of a surrounding annular frictional member, a pair of oscillatory thrust members interconnected for unison oscillation interposed between the adjacent ends of the arcuate frictional shoes, thrust seats on each of the thrust members engaged by the end of the corresponding arcuate shoe, means for actuating at least one oscillatory member of one of the pairs thereof, equalizing means for limiting the degree of oscillation of the members of one pair to that of the other pair, the construction and arrangement being such that the frictional shoes are simultaneously actuated through substantially straight line movement uniformly throughout their lengths into contact engagement with the surrounding annular member.

ARTHUR F. BERGER.

REFERENCES CITED

The following references are of record in the file of this patent:

UNITED STATES PATENTS

| Number | Name | Date |
|---|---|---|
| 857,970 | Wust-Kunz | June 25, 1907 |
| 1,653,948 | Dee | Dec. 27, 1927 |
| 1,941,965 | Albert | Jan. 2, 1934 |
| 2,042,454 | Banker | June 2, 1936 |
| 2,077,292 | Waseige | Apr. 13, 1937 |
| 2,151,950 | Tyler | Mar. 28, 1939 |

FOREIGN PATENTS

| Number | Country | Date |
|---|---|---|
| 30,104 | France | Mar. 27, 1926 |
| 66,786 | Switzerland | May 13, 1914 |
| 673,778 | France | Jan. 20, 1930 |